United States Patent [19]

Mass

[11] Patent Number: 5,294,764
[45] Date of Patent: Mar. 15, 1994

[54] REUSABLE MICROWAVE POPCORN CONTAINER FOR POPPING AND DISPENSING CORN KARNELS AND RECREATIONAL USE

[76] Inventor: Lawrence Mass, 14 Lincoln Ave., Rye Brook, N.Y. 10573

[21] Appl. No.: 840,497

[22] Filed: Feb. 24, 1992

[51] Int. Cl.⁵ .................................. H05B 6/80
[52] U.S. Cl. ..................... 219/727; 426/107; 426/113; 426/234; 426/243; 99/DIG. 14; 206/217
[58] Field of Search ............ 219/10.55 E, 10.55 F, 219/10.55 M; 426/107, 110, 113, 234, 243; 2/247; 206/217; 90/DIG. 14

[56] References Cited

U.S. PATENT DOCUMENTS

| | | | |
|---|---|---|---|
| 4,164,284 | 8/1979 | Witt et al. | 206/217 |
| 4,219,573 | 2/1979 | Borek | 426/107 |
| 4,279,933 | 1/1980 | Austin et al. | 426/124 |
| 4,292,332 | 9/1981 | McHam | 426/113 |
| 4,404,689 | 9/1983 | DeWan | 2/247 |
| 4,525,367 | 11/1983 | Allison | 426/394 |
| 4,553,010 | 7/1983 | Bohrer et al. | 219/10.55 E |
| 4,584,202 | 3/1984 | Roccaforte | 426/111 |
| 4,584,826 | 2/1984 | Watkins | 426/394 |
| 4,596,713 | 5/1984 | Burdette | 426/107 |
| 4,678,882 | 1/1986 | Bohrer et al. | 219/10.55 E |
| 4,734,288 | 4/1987 | Engstrom et al. | 426/107 |
| 4,806,371 | 11/1986 | Mendenhall | 426/113 |
| 4,810,844 | 11/1987 | Anderson | 219/10.55 E |
| 4,911,938 | 8/1988 | Fisher et al. | 426/107 |
| 4,924,050 | 10/1989 | Yivisaker | 426/394 |
| 4,937,810 | 7/1989 | Braumer | 219/10.55 E |
| 4,943,456 | 7/1990 | Pollart et al. | 219/10.55 E |
| 4,973,045 | 8/1976 | Brandberg et al. | 426/110 |
| 4,973,810 | 11/1990 | Brauner | 426/107 |
| 5,035,426 | 12/1990 | Spector | 273/65 EG |
| 5,044,777 | 9/1991 | Watkins et al. | 219/10.55 E |
| 5,045,659 | 7/1989 | Wolfe et al. | 219/10.55 E |

Primary Examiner—Bruce A. Reynolds
Assistant Examiner—Tu Hoang
Attorney, Agent, or Firm—Hoopgood, Calimafde, Kalil, Blaustein & Judlowe

[57] ABSTRACT

A microwave popcorn container for recreational use and a method of making and dispensing popcorn using the same. The microwave popcorn container has an outer casing substantially transparent to microwave radiation and resembles either a playball or novelty configuration having an interior space therein. When exposed to microwave radiation, corn kernels contained within the interior space of the outer casing burst into popcorn filling the outer casing. The microwave popcorn container may be used in a variety of recreational activities and when desired, popcorn can be dispensed therefrom and consumed. In the illustrative embodiment of the present invention, microwave popcorn containers resembling an elongated football, a substantially spherical playball and a novelty turtle are disclosed.

8 Claims, 7 Drawing Sheets

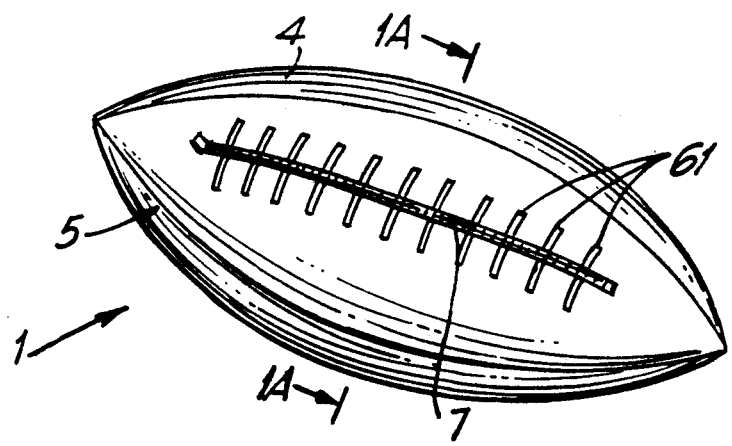
FIG. I
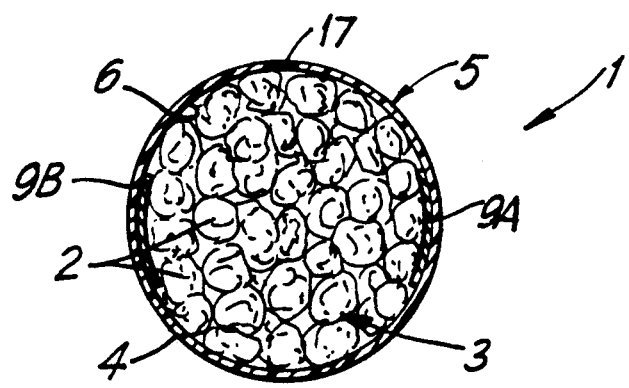
FIG. IA
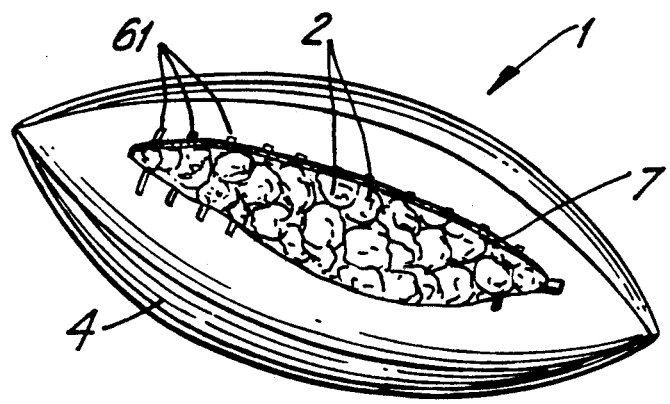
FIG. 2

REUSABLE MICROWAVE POPCORN CONTAINER FOR POPPING AND DISPENSING CORN KARNELS AND RECREATIONAL USE

BACKGROUND OF INVENTION

1. Field of Invention

The present invention relates to a microwave popcorn container resembling a playball or novelty configuration so that corn kernels can be popped therein when exposed to microwave radiation, and afterwards the popcorn container used in a variety of recreational activities, and popcorn dispensed therefrom when desired.

2. Brief Description of the Prior Art

Popcorn has long been a favorite food in our culture. In 1612, it was brought to the first Thanksgiving by the Indians and was subsequently used by America's earliest settlers as the base for their first meal of the day. Today, consumers are learning what the Pilgrims discovered three centuries ago, that is, popcorn is a healthy snack food having a number of beneficial properties. For example, the American Medical Association has recently endorsed popcorn as a good source of fiber, while the American Dental Association is presently examining its potential as a scrubbing agent against plaque and tartar.

In recent times, popcorn has enjoyed a marked increase in popularity as a snack food. One reason for the marked increase in popularity is that great tasting popcorn can be conveniently popped in a microwave oven in only a few minutes time. To fully appreciate why microwave-oven popcorn is said to taste better than popcorn produced in other ways, it is important to understand why corn kernels pop and how microwave packaging compliments the corn kernel popping process.

Corn kernels contain starch grains which are embedded in a protein matrix. In popcorn kernels the protein matrix is stronger than in other types of corn kernels due to the higher protein-to-starch ratio of popcorn kernels. When popcorn kernels are heated to about 150° F., the small amount of moisture which the kernels contain partially gelatizes the starch grains. As the kernel temperature reaches the boiling point of water, moisture in the kernel vaporizes and expands rapidly in volume. The hard protein matrix holds the kernel together until the vapor pressure becomes too great, at which point the kernel bursts open. Due to the sudden pressure drop, the endosperm of the kernel expands in volume. At the same time, the cooked starch grains are dried out as the water vapor escapes and thus the endosperm texture becomes light and crisp. However, if popcorn is cooked in a package or container that offers no escape for the water vapor, the spongy endosperm of the popcorn kernel will reabsorb the water vapor, resulting in chewy, tough popcorn.

Presently, microwave popcorn is packaged in paper and polyolefin packages which are formed into a bag configuration having one or more folded pleats. These folded pleats permit the popcorn package to be folded-down during shipping, and easily expanded when corn kernels burst under sufficient exposure to microwave radiation. In order to improve the heating performance of microwave popcorn packages, paper and polyolefin packages generally contain one or more microwave receptor or susceptor elements which achieve rapid, even heating of the kernels while minimizing the number of unpoppe kernels. As explained in the paper "Packaging For The Microwave Oven" presented at the Fifth International Association of The Packaging Research Institute by Michael R. Perry, "microwave susceptors" consist of metallized PET laminated onto paper or paper board. The metal used in these structures is typically aluminum, which is applied in a thin layer. The density of this thin metallic layer is selected so that it responds to the electromagnetic field of incident microwave radiation, thereby heating the thin metallic layer and thus the interior of the flexible popcorn package.

Another major reason for the recent success of microwave popcorn packages, is that they are simple to use. The consumer removes the popcorn package from its storage container, places the popcorn package in a microwave oven and then sets the microwave oven for several minutes. When the corn kernels in the bottom of the popcorn package are exposed to microwave radiation, moisture in the corn kernels is heated and soon thereafter the kernels burst into popcorn. As this process occurs, popcorn begins to fill and occupy the space within the popcorn package, causing it to expand. When nearly all the corn kernels are popped, the package assumes its bag configuration. At this time, the popcorn package is removed from the microwave oven, the package is opened, the popcorn is dispensed into a serving container and the popcorn eaten.

Microwave-oven popcorn packages of the type described above can be found in, for example, U.S. Pat. Nos. 5,045,659 to Wolfe et al.; 4,973,810 to Brauner; 4,950,859 to Anderson; 4,911,938 to Fisher et al.; 4,810,844 to Anderson; 4,806,371 to Mendenhall; 4,734,288 to Engstrom et al.; 4,678,882 to Bohrer et al; 4,596,713 to Burdette; 4,584,202 to Roccaforte; 4,553,010 to Bohrer et al.; 4,548,826 to Watkins; 4,525,367 to Allison; 4,279,933 to Austin et al.; 4,219,573 to Borek; and 3,973,045 to Brandberg et al.

While such prior art packages have permitted a way to produce popcorn in a microwave oven, their use has been generally limited to containing corn kernels and seasoning while popcorn popping.

Consequently, there is a great need for a microwave popcorn container which in addition to popping popcorn, encourages recreational activity prior to or during consumption.

OBJECTS AND SUMMARY OF THE PRESENT INVENTION

Accordingly, it is a primary object of the present invention to provide a microwave popcorn container which, in addition to popping corn kernels, is particularly adapted for safe use in various types of recreational activities. In particular, the microwave popcorn container provided resembles a playball or novelty configuration, in which popcorn can be produced when radiated in a microwave oven, and which can be subsequently used in a variety of recreational or play activities, and from which popcorn can be dispensed for consumption when desired.

It is another object of the present invention to provide a microwave popcorn container which resembles a playball or a novelty configuration having an outer casing which resembles either a playball or novelty configuration, and which is substantially transparent to microwave radiation. In an illustrative embodiment, a reclosable opening is provided through the outer casing. The reclosable opening permits reclosable access into the interior space of the outer casing for introducing and containing corn kernels thereby providing a reusable microwave popcorn container. When the microwave popcorn container is closed and exposed to microwave radiation, the corn kernels burst into popcorn and fill the outer casing. The microwave popcorn container may be used in a variety of play activities and also for dispensing popcorn for consumption when desired.

It is another object of the present invention to provide a microwave popcorn container which has a flexible outer casing transparent to microwave radiation and an exterior surface and an interior surface for defining an expandable interior space therein. In an illustrative embodiment, a reclosable opening is provided through the flexible outer casing. The reclosable opening permits reclosable access into the expandable interior space for introducing and containing corn kernels. When the flexible outer casing is exposed to microwave radiation, corn kernels contained therein burst into popcorn in the expandable interior space and expand the flexible outer casing into a playball configuration such as an elongated football or spherical playball, or into a novelty configuration such as an animal, fruit, vegetable, vehicle, space ship or any other novelty figure.

It is another object of the present invention to provide a novel method of preparing the microwave popcorn container hereof for recreational use. In general, the method involves providing a microwave popcorn container according to the present invention. A sufficient amount of corn kernels are contained within the interior space thereof. The microwave popcorn container is placed within a microwave oven and the door thereof closed shut. The microwave oven is activated for a preselected time period so that microwave radiation is generated and the microwave popcorn container, and thus corn kernels, are exposed to microwave radiation. After sufficient radiation exposure, the corn kernels burst into popcorn in the interior space, filling the outer casing. When the outer casing is filled, the popcorn container is removed from the microwave oven and may be subsequently used in recreational activities. When desired, popcorn contained within the popcorn container can be dispensed and consumed.

The microwave popcorn container of the present invention may assume a wide variety of playball and novelty configurations. Preferably, the exterior surface thereof bears graphical ornamentation, depicting various features associated with particular playball or novelty designs.

As a result of the present invention, a novel way to prepare and serve popcorn is provided. By encouraging recreational activity in the young and old alike, the microwave popcorn container of the present invention contributes to the enjoyment of eating popcorn while enhancing the creative imagination of the user.

These and other objects of the present invention will become apparent hereinafter.

BRIEF DESCRIPTION OF THE DRAWINGS

For a more complete understanding of the objects of the present invention, the Detailed Description of the Illustrative Embodiments is to be taken in connection with the following drawings, wherein:

FIG. 1 is a perspective view of the first illustrative embodiment of the microwave popcorn container of the present invention, showing its flexible outer casing which resembles an elongated football when the interior space thereof is filled with popcorn;

FIG. 1A is a cross-sectional view of the popcorn container taken along line IA—IA of FIG. 1, showing popcorn produced therein, the slit closure element, and microwave-energy interactive elements disposed on the interior surface of the flexible outer casing;

FIG. 2 is a perspective view of the popcorn container of FIG. 1, shown in its expanded, popcorn-containing state with its slit closure element opened for dispensing popcorn;

DETAILED DESCRIPTION OF THE ILLUSTRATIVE EMBODIMENTS

The first illustrative embodiment of the microwave popcorn container of the present invention will be described with reference to FIGS. 1 through 3B.

As illustrated in FIG. 1, microwave popcorn container 1 is shown in its fully expanded, popcorn-containing state, in which it assumes an elongated football configuration. As will be described in greater detail hereafter, popcorn 2 produced within its expandable interior space 3 expands flexible outer casing 4 into an elongated football configuration which, in the illustrative embodiment, will be substantially maintained during use in recreational activity provided the flexible outer casing contains a sufficient volume of popcorn.

Figure 10A:
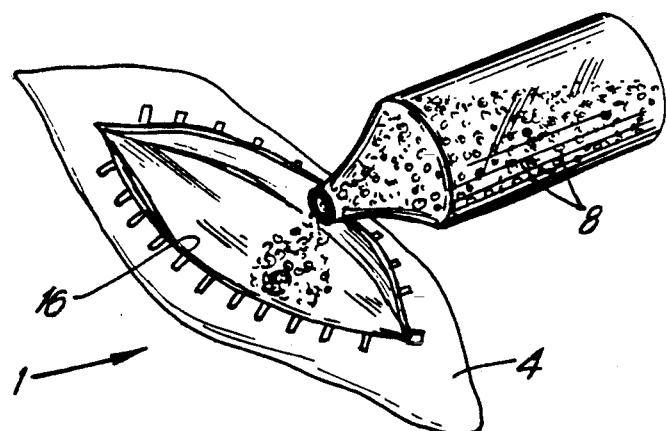
FIG. 10A is a perspective view of the first illustrative embodiment of the microwave popcorn container hereof, shown in its non-expanded state while filled with a selected amount of corn kernels for popping.

In general, flexible outer casing 4 is substantially transparent to microwave radiation and has an exterior surface 5 and an interior surface 6 defining expandable interior space 3. In the illustrative embodiment, a reclosable opening 7 is provided in the flexible outer casing to permit reclosable access into the expandable interior space for the purpose of introducing and containing therewith, corn kernels 8 or like expandable food product, as shown in FIG. 10A. As used hereinafter, the term "corn kernel" shall encompass all such expandable food products, and the term "popcorn" shall encompass expanded food products resulting therefrom.

When popcorn container 1 is exposed to microwave radiation, the corn kernels respond to microwave radiation in a conventional manner and burst into popcorn 2 filling the interior space and expanding the flexible outer casing into the elongated football configuration shown in FIGS. 1 and 2. In order to increase and render uniform the temperature within the interior space of the popcorn container, a pair of microwave-energy interactive film structures 9A and 9B may be provided to interior surfaces of outer casing 4. Microwave-energy interactive structures 9A and 9B can be of the susceptor type, in which incident microwave radiation is converted into heat. Alternatively, microwave-energy interactive structures 9A and 9B can be of the receptor type, in which incident microwave radiation is reflected inside the interior space in a desired manner. In some applications, the microwave-energy interactive structures may perform a combination of these functions in order to achieve desired heating characteristics inside the outer casing of the popcorn container. Suitable microwave-energy interactive structures are described in detail in U.S. Pat. Nos. 4,190,757; 4,973,810 and 5,045,659, which are incorporated herein by reference.

During the popcorn popping process, water vapor from bursted corn kernels is released within the interior space of the outer casing, increasing the vapor pressure therewith to sufficiently high levels at times. In some applications of the present invention, it may be desirable, for one or more reasons, to provide a means for venting such vapor to the ambient environment. For example, in some applications, a vapor venting mechanism may be desired for the purpose of allowing a selected amount of water vapor from bursted kernels to be reabsorbed within the endosperm of popcorn so as to achieve a desired popcorn texture. In other applications, such as in the illustrative embodiments, a vapor venting mechanism may also be desired to ensure that vapor pressure generated within the interior space of each flexible outer casing does not rise to extreme levels sufficient to damage the structural integrity of the microwave popcorn container. In the illustrative embodiments, this vapor venting means is preferably achieved by use of slit closure element which when closed, permits a desired degree of vapor venting to the ambient atmosphere, while containing the corn kernels within the outer casing. As will be illustrated in greater detail hereinafter, a reclosable element, such as, for example, a zipper, snap-fit fastener, button-closure or Velcro ® hook-and-loop fastener can be used to achieve this desired function, as by the nature of such fastners, air venting and vapor is achievable during typical closure operations.

Once in its substantially expanded popcorn containing state, shown in FIG. 1, popcorn container 1 may be used in a variety of indoor or outdoor recreational activities. As shown in FIG. 2, popcorn 2 can be dispensed through reclosable opening 7 and then consumed when desired in a conventional manner.

Figure 3A:
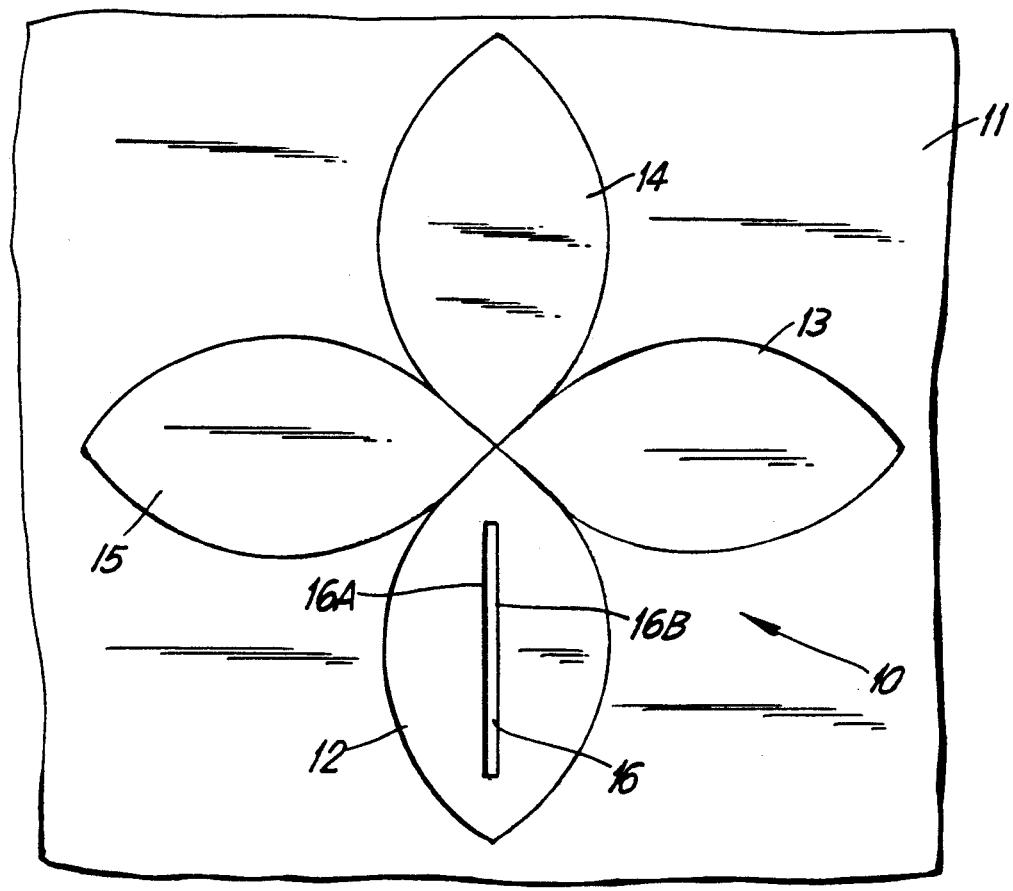
FIG. 3A is a plan view of the outer casing pattern cut into a sheet of flexible, microwave transparent material which, when seamed together, forms the flexible outer casing of the popcorn container shown in FIG. 1.
Figure 3B:
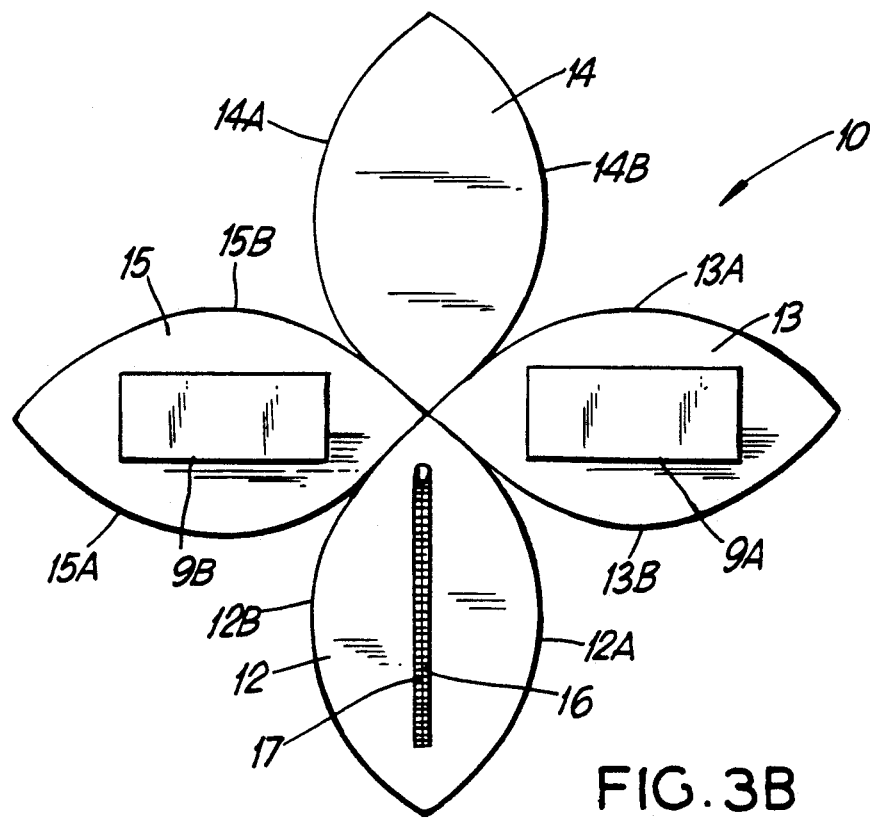
FIG. 3B is a plan view of the outer casing pattern of FIG. 3A, showing the slit closure element installed along the elongated slit in the outer casing pattern and microwave energy interactive structures disposed on the interior surface thereof.

Referring to FIGS. 3A and 3B, a method of constructing microwave popcorn container 1 will now be described. As shown in FIG. 3A, flexible outer casing 4 can be made by cutting an outer casing pattern 10 into a sheet of flexible material 11 which can withstand melting at temperatures attained within a microwave oven during corn popping and rough handling expected during recreational play activity. Flexible material for this purpose can be any suitable plastic, paper, paper/plastic composite or fabric. As shown, pattern 10 comprises four outer casing pieces 12, 13, 14, and 15, with elongated slit 16 formed in outer casing piece 12.

As illustrated in FIG. 3B, each piece of outer casing pattern 10 has a pair of perimeter edges which are identified as follows. The perimeter edges of outer casing piece 12 are indicated by 12A and 12B; the perimeter edges of outer casing piece 13 are indicated by 13A and 13B; the perimeter edges of outer casing piece 14 are indicated by 14A and 14B; and the perimeter edges of outer casing piece 15 are indicated by 15A and 15B. While not shown, it is understood that during manufacturing of the outer casing pattern, a number of such patterns can be simultaneously formed in a sheet of flexible material moving past a high-speed pattern cutting machine well known in the art.

In order to achieve desired heating characteristics within popcorn container, microwave-energy interactive structures 9A and 9B may be provided to the interior surface of outer casing pieces 13 and 15, as shown in FIG. 3B. To form reclosable opening 7 through the flexible outer casing of the popcorn container, a nonmetallic closure element such as, for example, a zipper, snap-fit fastner, button-closure or a Velcro ® hook-and-loop fastener 17 is installed between the perimeter edges 16A and 16B of elongated slit 16. The installation of slit closure element 17 can be achieved using stitching, high temperature adhesive or other suitable securing techniques shown in the prior art.

In the illustrative embodiment, flexible outer casing 4 is formed b interfitting outer casing pieces 12 through 15 and seaming them together. Specifically, corresponding portions of perimeter edge pairs 12A and 13B, 13A and 14B, 14A and 15B, and 15A and 16B are joined and seamed together to form flexible outer casing 4, through which access can be achieved by opening slit closure device 17. Seaming of these perimeter edges can also be achieved in a variety of ways, depending primarily on the particular type of flexible material used to fabricate the flexible outer casing. For example, the seams can be realized with stitching when natural or synthetic fabric is used to form the flexible outer casing. Heat or ultrasonic welding or high-temperature resistant adhesive can be employed to effect the seams when flexible plastic, or paper/plastic composite material is used.

The second illustrative embodiment of the microwave popcorn container of the present invention, will now be described with reference to FIGS. 4 through 6B.

Figure 4:
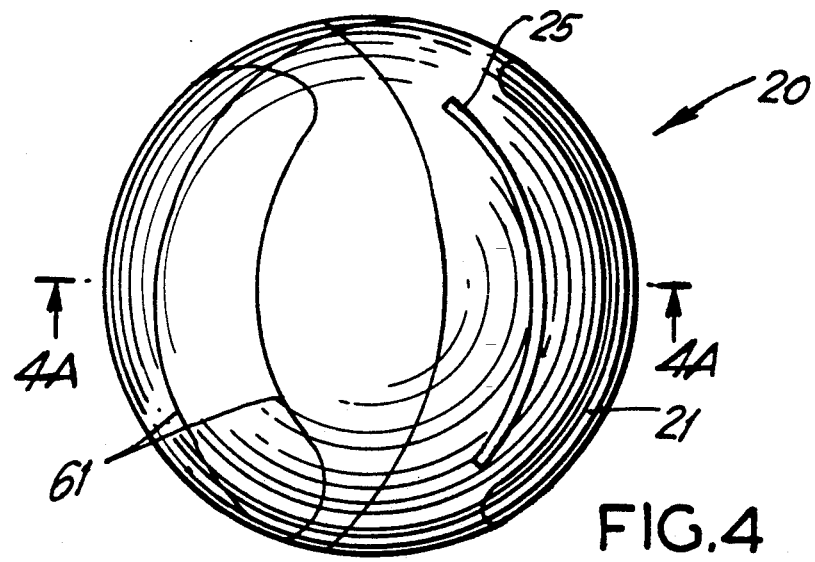
FIG. 4 is a perspective view of a second illustrative embodiment of the microwave popcorn container of the present invention, showing its flexible outer casing which resembles a substantially spherical playball when the interior space thereof is filled with popcorn.

As illustrated in FIG. 4, microwave popcorn container 20 is shown in its fully expanded, popcorn-containing state, in which its flexible outer casing 21 assumes a substantially spherical configuration. In general, flexible outer casing 21 is substantially transparent to microwave radiation and has an exterior surface 22 and an interior surface 23 defining expandable interior space 24. In this illustrative embodiment, a reclosable opening 25 in flexible outer casing 21 permits reclosable access into the expandable interior space for introducing and containing corn kernels therewithin. When popcorn container 20 is exposed to microwave radiation, corn kernels contained therein respond to microwave radiation in a conventional manner and burst into popcorn, filling the interior space and expanding flexible outer covering 21 into a substantially spherical playball configuration shown in FIGS. 4 and 5.

Figure 4A:
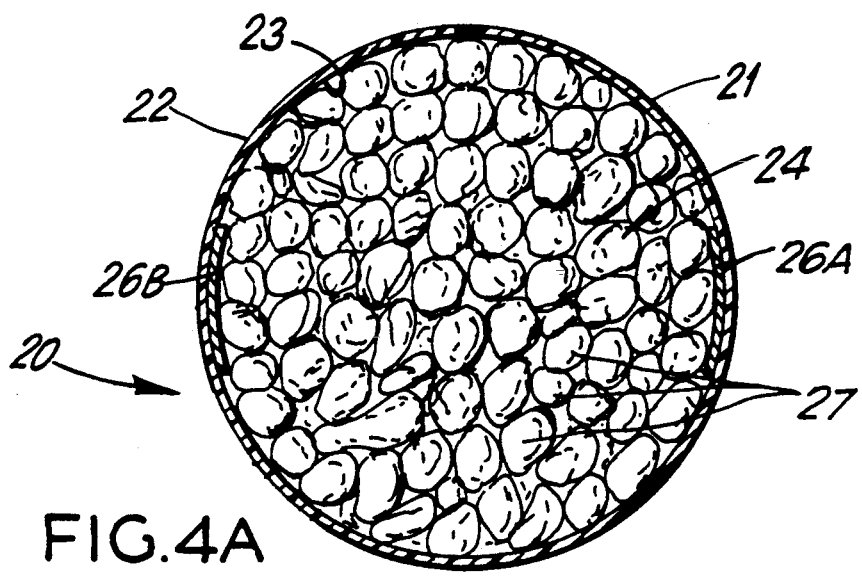
FIG. 4A is a cross-sectional view of the popcorn container taken along line 4A—4A of FIG. 4, showing popcorn produced therein, the slit closure element, and microwave-energy interactive elements disposed on the interior surfaces of the flexible outer casing.
Figure 5:
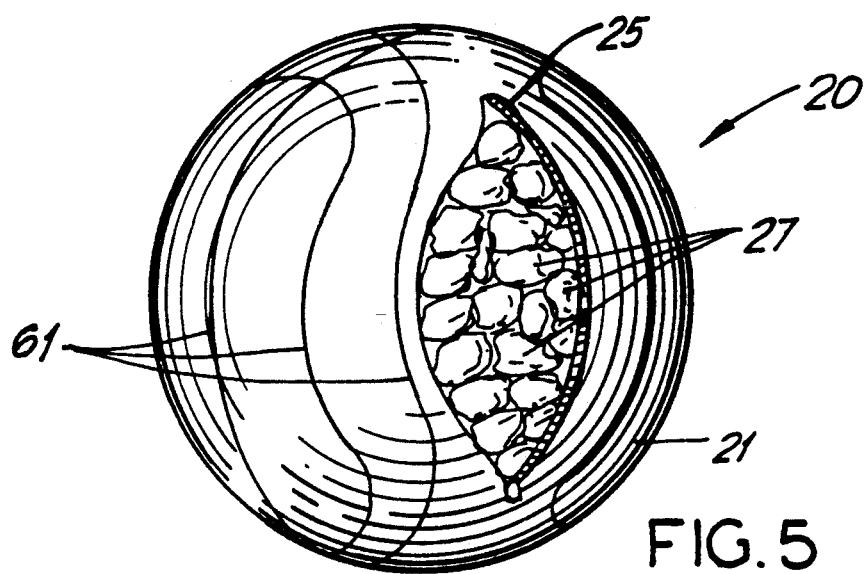
FIG. 5 is a perspective view of the popcorn container of FIG. 4, shown in its expanded, popcorn-containing state with its slit closure element opened for dispensing popcorn.

In order to increase and render uniform the temperature within interior space 23, microwave-energy interactive structures 26A and 27B may be provided to opposing interior surfaces areas of the flexible outer casing. Once in its substantially expanded, popcorn-containing state, popcorn container 20 may be used in a variety of indoor or outdoor recreational activities. As shown in FIG. 4A, popcorn 27 can be dispensed through reclosable opening 25, and when desired, consumed in a conventional manner.

Figure 6A:
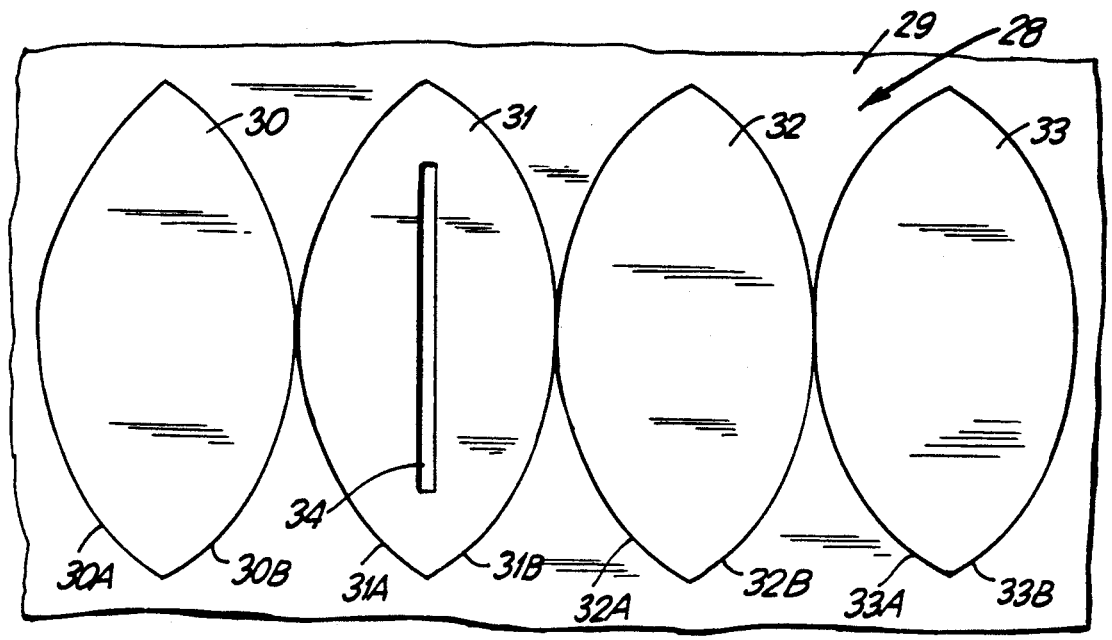
FIG. 6A is a plan view of the outer casing pattern cut into a sheet of flexible, microwave transparent material which, when seamed together, forms the flexible outer casing of the popcorn container shown in FIG. 4.
Figure 6B:
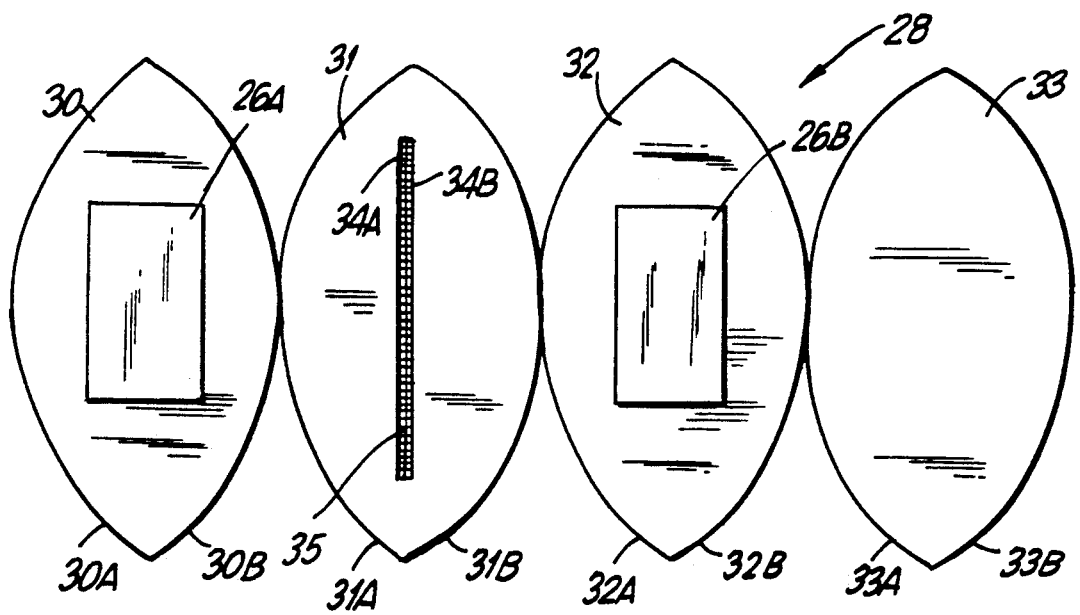
FIG. 6B is the plan view of the outer casing pattern of FIG. 6A, showing the slit closure element installed along the elongated slit and microwave-energy interactive structures disposed on the interior surface thereof.

Referring to FIGS. 6A and 6B, a method of constructing microwave popcorn container 20 will now be described. As shown in FIG. 6A, flexible outer casing 21 can be made by cutting an outer casing pattern 28 into a sheet of flexible material 29 which can withstand melting at temperatures attained within a microwave oven during corn popping and rough handling expected during play activity. Flexible material for this purpose can be any suitable plastic, paper, paper/plastic composite or fabric. Outer casing pattern 28 comprises four pieces 30, 31, 32, and 33, with an elongated slit 34 formed in outer casing piece 31 as shown.

As illustrated in FIG. 6B, each piece of outer casing pattern 28 has a pair of perimeter edges which are identified as follows. The perimeter edges of outer casing piece 30 are indicated by 30A and 30B; the perimeter edges of outer casing piece 31 are indicated by 31A and 31B, the perimeter edges of outer casing piece 32 are indicated by 32A and 32B; and the perimeter edges of outer casing piece 33 are indicated by 33A and 33B. It is understood that during manufacturing of flexible outer casing pattern 21, a number of such outer casing patterns can be simultaneously formed in a sheet of flexible material moving past a high-speed pattern cutting machine well known in the art.

To achieve desired heating characteristics within popcorn container, microwave-energy interactive structures 26A and 26B may be provided to the interior surface of outer casing pieces 30 and 32. To form a reclosable opening through the flexible outer casing, a non-metallic closure element such as, for example, a zipper, snap-fit fastener, button-closure or a Velcro ® hook-and-loop fastener 35, is installed between the perimeter edges 34A and 34B of elongated slit 34. The installation of such slit closure device can be achieved using stitching, high temperature adhesive or other suitable securing techniques well known in the prior art.

In the illustrative embodiment, the flexible outer casing 21 is formed by interfitting outer casing pieces 30 through 33, and seaming them together. Specifically, corresponding portions of perimeter edge pairs 30B and 31A, 31B and 32A, 32B and 33A, and 33B and 30A are joined and seamed together to form flexible outer casing 21, through which access can be achieved by opening slit closure device 35. Seaming these perimeter edges can also be achieved in a variety of ways, depending primarily on the particular type of flexible material used to fabricate the flexible outer casing. For example, the seams can be realized using stitching when natural or synthetic fabric is used to form the outer casing. Heat or ultrasonic welding or high-temperature resistant adhesive can be employed to effect seams when flexible plastic or paper/plastic composite material is used.

The microwave popcorn container of the present invention can also be realized in a wide variety of novelty configurations resembling, for example, animal forms, fruit or vegetable figures, vehicles, inanimate objects, doll figures and the like. To illustrate this aspect of the present invention, a third illustrative embodiment of the microwave popcorn container will be described with reference to FIGS. 7 through 9B.

Figure 7:
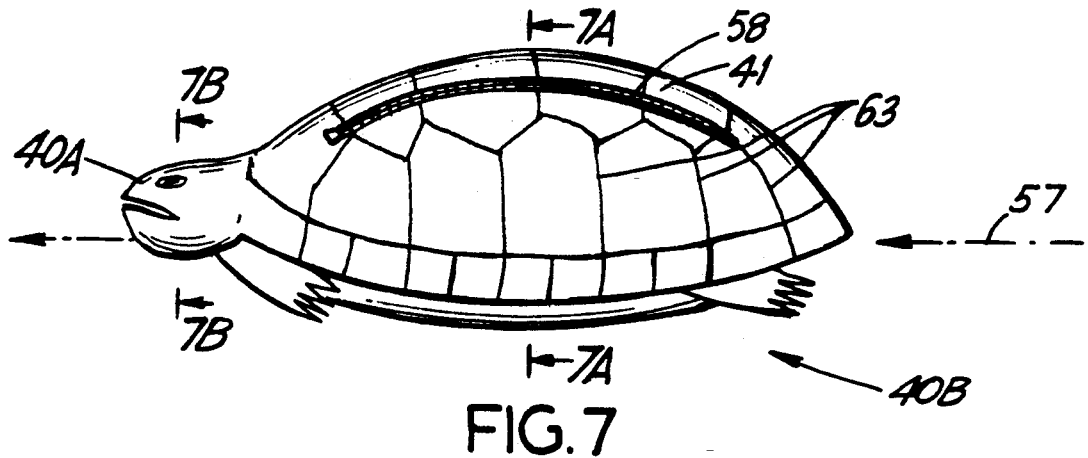
FIG. 7 is a perspective view of a third illustrative embodiment of the microwave popcorn container of the present invention, showing its flexible outer casing which resembles a novelty configuration when the interior space is filled with popcorn.
Figure 7A:
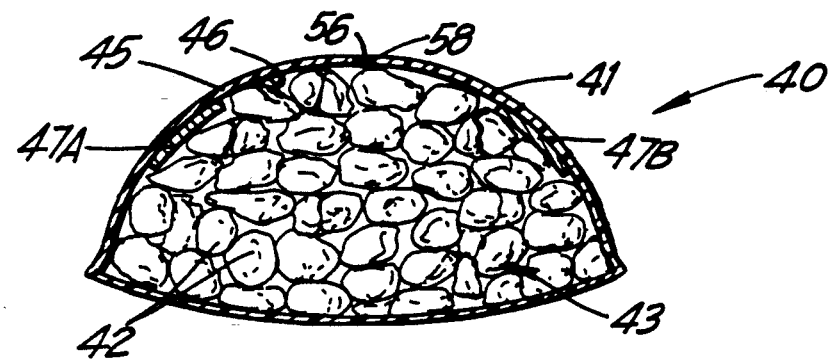
FIG. 7A is a cross-sectional view of the popcorn container taken along line 7A—7A of FIG. 7, showing popcorn produced therein, the slit closure element, and microwave-energy interactive elements disposed on the interior surface of the flexible outer casing.
Figure 7B:
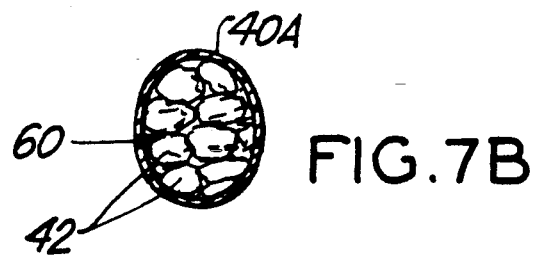
FIG. 7B is a cross-sectional view of the popcorn container taken along line 7B—7B of FIG. 7.
Figure 8:
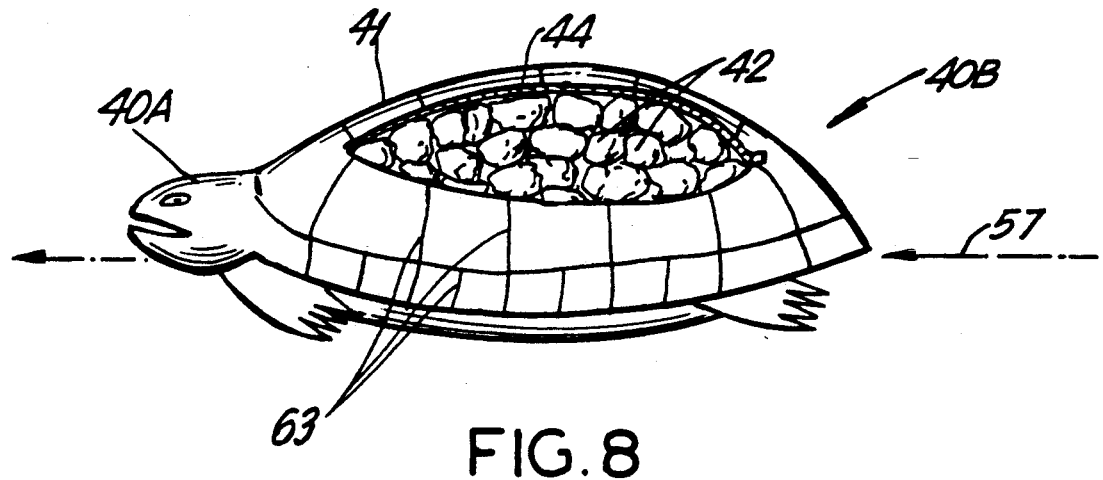
FIG. 8 is a perspective view of the popcorn container of FIG. 7, shown in its expanded, popcorn-containing state with its slit closure element opened for dispensing popcorn.

As illustrated in FIG. 7, microwave popcorn container is shown in its fully expanded popcorn-containing state, in which flexible outer casing 41 assumes a novelty turtle configuration. In this expanded state popcorn container 40 can be used in a variety of recreational activities. As shown in FIG. 8, popcorn 42 within the interior space 43 of its flexible outer casing 41 can be dispensed through reclosable slit opening 44, and thereafter consumed when desired. Flexible outer casing 41 is substantially transparent to microwave radiation and has an exterior surface 45 and an interior surface 46 defining expandable interior space 43. In the illustrative embodiment, reclosable slit opening 44 in flexible outer casing 41 permits reclosable access into the expandable interior space for introducing and containing corn kernels therewithin. When the popcorn container is exposed to microwave radiation, the corn kernels contained therein respond to microwave radiation in a conventional manner and burst into popped corn 42, filling the interior space and expanding flexible outer covering 41 into the novelty turtle configuration shown in FIGS. 7 and 8. In order to increase and render uniform the temperature within interior space 43, microwave-energy interactive structures 47A and 47B may be provided to interior surfaces areas of the flexible outer casing. Once in its substantially expanded-state, popcorn container 40 may be used in a variety of indoor and outdoor play activities. When desired, popcorn can be dispensed through reclosable slit opening 44 as shown in FIG. 8, and then consumed in a conventional manner.

Figure 9A:
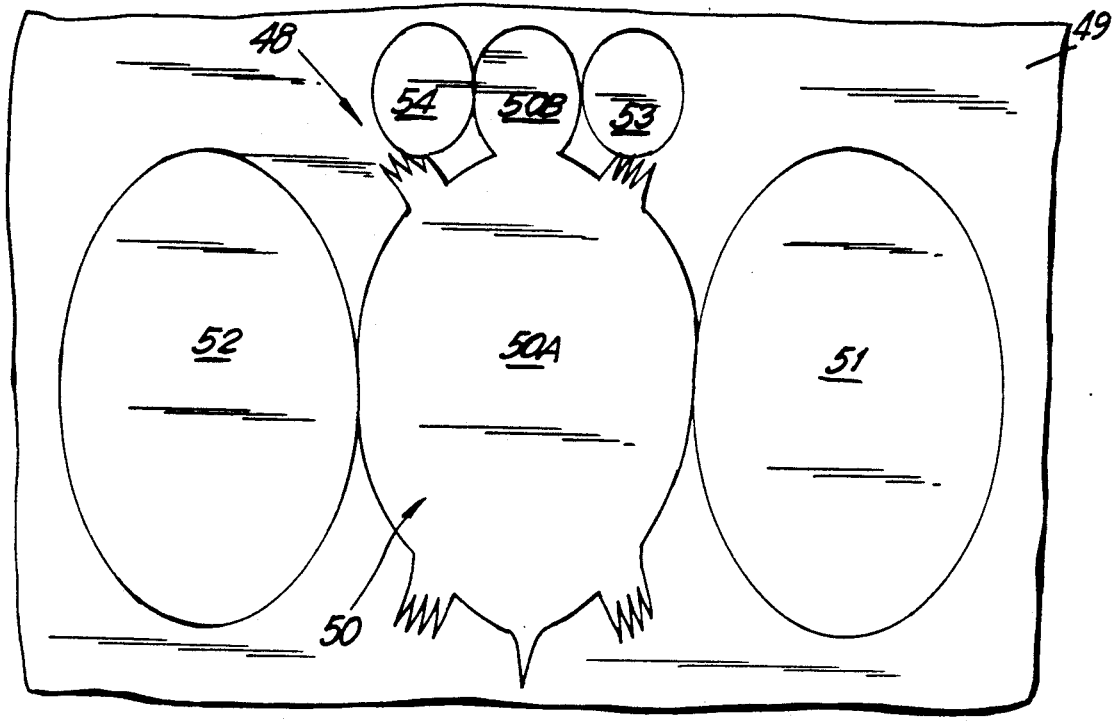
FIG. 9A is a plan view of the outer casing pattern cut in a sheet of flexible, microwave transparent material which, when seamed together, forms the flexible outer casing of the popcorn container shown in FIG. 7.
Figure 9B:
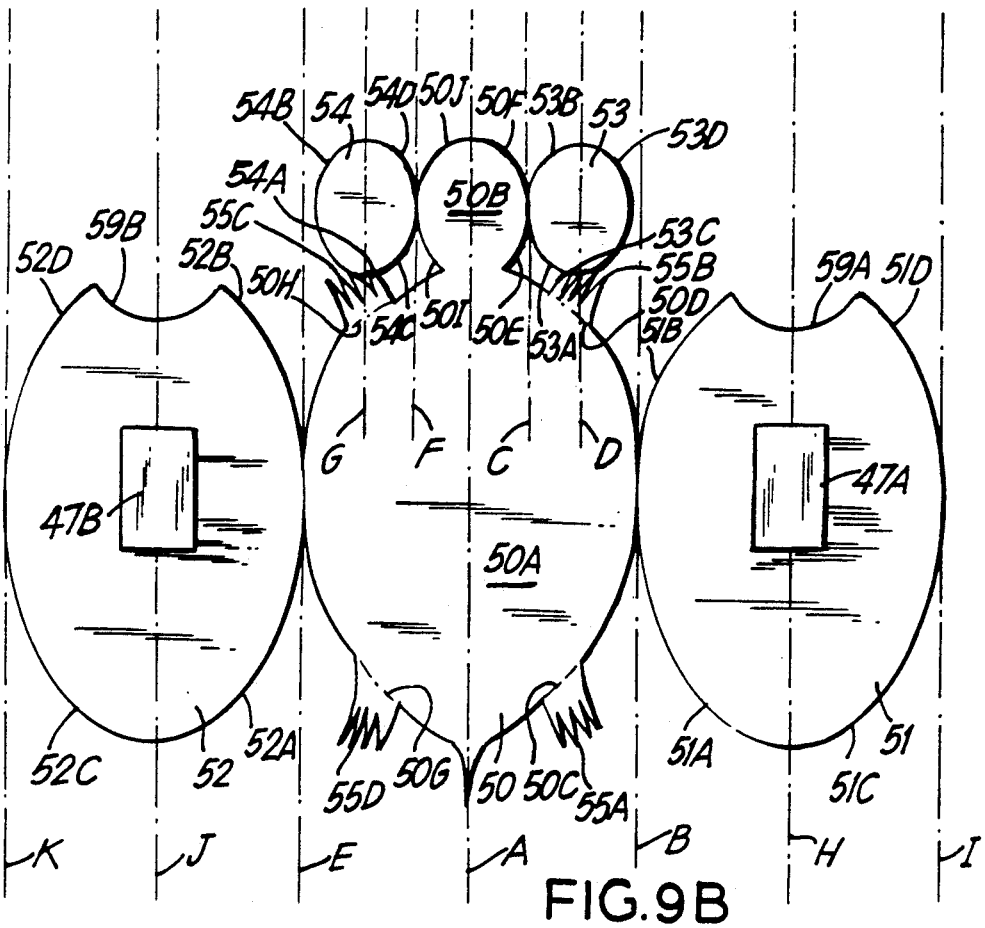
FIG. 9B is a plan view of outer casing pattern of FIG. 9A, showing the slit closure element installed along the elongated slit and microwave energy interactive structures disposed on the interior surface thereof.

Referring to FIGS. 9 and 9B, a method of constructing microwave popcorn container 40 will now be described. As shown in FIG. 9A, flexible outer casing 41 can be made by cutting an outer casing pattern 48 into a sheet of flexible material 49 which can withstand melting at temperatures attained within a microwave oven during corn popping and rough handling expected during play activity. Flexible material for this purpose can be any suitable plastic, paper, paper/plastic composite or fabric. As shown, outer casing pieces 50, 51, 52, 53 and 54 which when seamed together as described below, provide the flexible outer casing for the head and shell portions of the novelty turtle configuration.

As illustrated in FIG. 9B, outer casing piece 50 has a shell bottom casing portion 50A and integrally formed head bottom casing portion 50B. Flexible structures 55A through 55D extend (i.e. project) from the perimeter edges of shell bottom casing portion 50A and provide ornamental webbed turtle feet. Flexible structure 55E, on the other hand, provides an ornamental tail for the novelty turtle configuration. Preferably, shell casing portions 51 and 52 are connected in an integral fashion with shell bottom casing portion 50, as shown.

Perimeter edges 50C and 50D of the shell bottom casing portion extend between reference lines A and B, whereas perimeter edges 50E and 50F of the head bottom casing portion 50B extend between reference lines A and C. Perimeter edges 53A and 53B of head top casing portion 53 extend between reference lines C and D, and perimeter edges 53C and 53D of head top casing portion 53 extend between reference lines D and B. As outer casing pattern 48 is symmetrical about reference line A, corresponding perimeter edges are present between reference lines A and E. Specifically, perimeter edges 50G and 50H of shell bottom casing portion 50A extend between reference lines E and A, whereas perimeter edges 54A and 54B of head top casing portion 54 extend between reference lines E and G. As illustrated, perimeter edges 54C and 54D of head top casing portion 54 extend between reference lines G and F, whereas perimeter edges 50I and 50J of head bottom casing portion 50B extend between reference lines F and A. Also, perimeter covering edges 51A and 51B of shell top casing portion 51 extend between reference lines B and H, whereas perimeter edges 51C and 51D of shell top casing portion 51 extends between reference lines H and I. Similarly, perimeter edges 52A and 52B of shell top casing portion 52 extend between reference lines J and E, whereas perimeter edges 52C and 52D of shell top casing portion 52 extend between reference lines K and J, as shown.

Prior to forming the flexible outer casing for the turtle configuration shown in FIG. 1, microwave-energy interactive structures 47A and 47B may be provided to shell top casing portions 51 and 52 in a manner known in the art. Thereafter, corresponding perimeter edges identified above are interfitted and seamed together in a manner similar to that described in connection with first and second embodiments of the invention. The details of the seaming process for microwave popcorn container 40 will be described below with reference to FIG. 9B.

Perimeter edges 50E and 53A, and 50F and 53B, are seamed together and then perimeter edges 50I and 54C and 50J and 54D seamed together. In order to complete assembly of the outer casing for head portion 40A of the turtle shaped popcorn container, perimeter edges 53D and 54B are seamed together. Then, perimeter edges 51B and 50D, and 51A and 50C are seamed together, and thereafter perimeter edges 52B and 50H and 52A and 50G. To complete the assembly of shell portion of the turtle shaped popcorn container 40B, perimeter edges 51C and 52C and 51D and 52D are seamed together so as leave an elongated slit 56 extending along the longitudinal axis 57 which passes through the turtle shell portion of the flexible outer casing as shown in FIGS. 7 and 8. Thereafter, a plastic closure element, such as, for example, a zipper or Velcro® hook-and-loop fastener 58 is installed along elongated slit 56 to provide a slit closure device which permits reclosable access into the expandable interior space of the flexible outer casing. Finally, to complete the interconnection between the head portion and the shell portion of the turtle configuration, perimeter edges 59A and 53C, and 59B and 54A are seamed together.

When such perimeter edges are seamed, expandable interior space 60 of the turtle head portion will be in communication with the expandable interior space of the turtle shell portion. This feature of the illustrative embodiment allows popcorn produced within the turtle shell portion, to flow or be shaken into the turtle head portion after the turtle shell outer casing has been filled with popcorn. In alternative embodiments, the interior space of such extremities or structural appendages may be physically isolated from the expandable interior space within which corn kernels are popped. In such embodiments, the interior space of these extremities can be permanently filled with a filler material during the manufacture of the popcorn container. Preferably, such filler material will be selected on the basis of its food compatibility and safety properties.

While the illustrative embodiments of the present invention described above have involved seaming together various pieces of precut material, it is contemplated that alternative techniques may be employed. For example, in the illustrative embodiment the surface geometry of the popcorn containers of the present invention may be imparted using thermo-forming techniques in which precut sheet material is preshaped under high pressure and temperature conditions well beyond that present in conventional microwave cooking environments. In this way, the number of seaming operations required during manufacture can be reduced, and in particular embodiments, possibly eliminated altogether. In another alternative embodiment, the outer casing of the microwave popcorn container hereof may be of a substantially non-flexible nature and fabricated from microwave-transparent material using plastic-molding technology such as injection-molding, blow-molding and rotational-molding.

In order to render the popcorn container of the present invention with a realistic appearance, ornamental artwork representative of surface texturing, coloring, graphical and/or structural features and the like can be applied to the exterior surface of the outer casing of the microwave popcorn containers hereof. For example, graphical indicia 61 representative of football shoestrings, pigskin texturing and the like can be printed or embossed onto the exterior surface of flexible sheet material 11. Preferably, such printing or embossing is achieved prior to pattern cutting and seaming operations employed in the manufacture of microwave popcorn container 1 shown in FIGS. 1 and 2. Graphical indicia 61 representative of leather pattern boundaries commonly associated with regulation basketballs and soccer balls, can be similarly printed or embossed to the outer casing of microwave popcorn container 20 shown in FIGS. 4 and 5. Likewise, ornamental artwork 63 representative of the turtle shell spotting, facial features, webbed feet, and the turtle tail can be similarly applied to the outer casing of microwave popcorn container 40 shown in FIGS. 7 and 8. In addition, graphics, including logos, may be printed on the exterior surface of any popcorn container of the present invention for promotional purposes and the like.

Figure 10B:
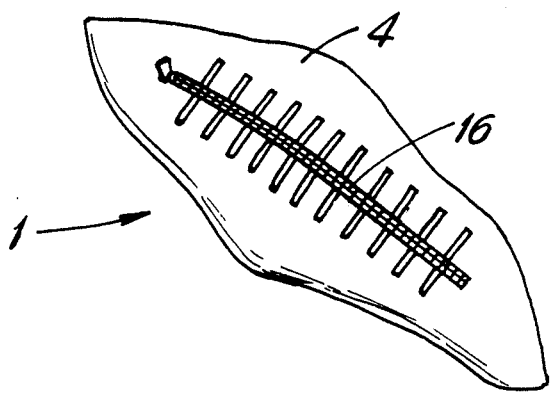
FIG. 10B is a perspective view of the charged popcorn container of FIG. 10A, shown with its slit closure element closed.

Having described the illustrative embodiments of the present invention, a method of preparing and dispensing popcorn using such popcorn containers will now be described with reference to FIGS. 10A, 10B and 10C.

As illustrated in FIG. 10A, the method involves providing a charged microwave popcorn container, such as for example, popcorn container 1, 20 or 40. The charged popcorn container contains a sufficient amount of corn kernels within the interior space of its outer casing. In the illustrative embodiment of the method, the amount of corn kernels 8 is selected so that when a substantial portion thereof bursts, the resulting volume of popcorn fills the expandable interior space until flexible outer casing 4 assumes an elongated football configuration. In the illustrative embodiment, microwave popcorn container 4 is charged by opening slit closure device 17, spreading apart the perimeter edges of elongated slit 16, and then introducing the selected amount of corn kernels 8 into the interior space of the outer casing. Then, as illustrated in FIG. 10B, elongated slit 16 is closed by operating the slit closure device.

Figure 10C:
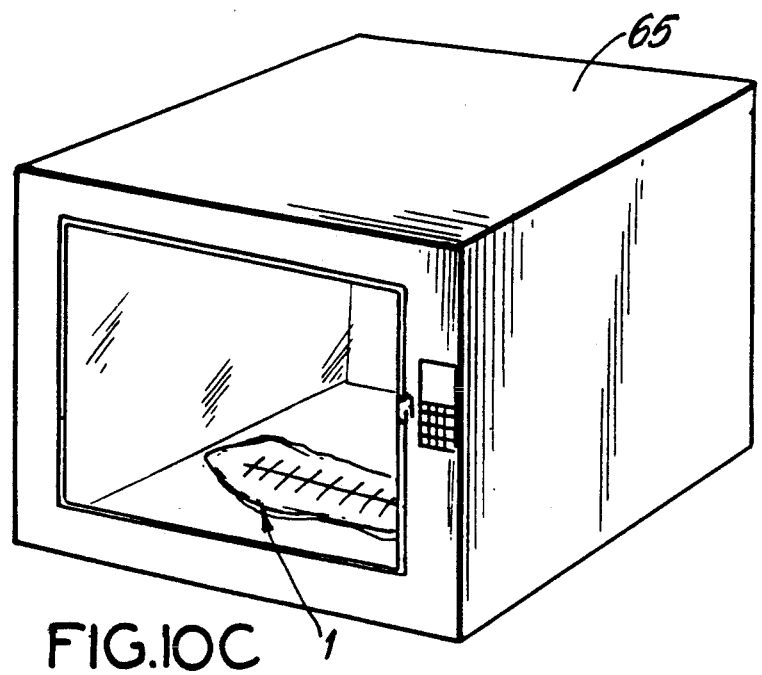
FIG. 10C is the perspective view of the charged popcorn container of FIG. 10B, shown placed inside a conventional microwave oven for popping corn kernels contained therein.

As shown in FIG. 10C, the charged popcorn container is then placed inside a conventional microwave oven 65. Then with the oven door closed and the microwave oven activated for a preselected time period (e.g. several minutes), the popcorn container (and thus the corn kernels contained therein) are exposed to microwave radiation generated within the microwave oven. Shortly thereafter, corn kernels burst into popcorn, filling the interior space and expanding the flexible outer casing into the elongated football configuration shown in FIG. 1. When the popcorn container attains its fully expanded playball configuration, it is removed from the microwave oven. Subsequently the popcorn container can be used in a variety of recreational activities. When desired, popcorn contained within the outer casing can be dispensed by, for example, opening the slit closure device, and then consumed. If desired, a portion of the popcorn can be dispensed, consumed, the popcorn container reclosed, and recreational activity resumed. Alternatively, the entire popcorn contents may be dispensed and consumed in a single sitting, and the popcorn container may be refilled and reused thereafter.

The method described above can be carried out using any microwave popcorn container constructed according to the present invention. If desired, the outer casing of the popcorn container may be made from suitable materials which are washable in either an automatic dishwasher or washing machine. In the case of the illustrative embodiments described above, the flexible outer casing can be inverted so that its interior surface is facing outwardly, while its exterior surface is facing inwardly. This will facilitate washing action when attempting to remove residual oil and/or seasonings applied to the popcorn, either prior to or after popcorn popping.

While the particular illustrative embodiments shown and described above will be useful in many applications, further modifications to the present invention herein disclosed will occur to persons with ordinary skill in the art. All such modifications are deemed to be within the scope and spirit of the present invention defined by the appended claims.

What is claimed is:

1. A reusable microwave popcorn container for popping and dispensing popcorn and recreational use, which comprises:
    (a) a flexible outer casing substantially transparent to microwave radiation and having an exterior surface and an interior surface for defining a vacant expandable interior space therein, said flexible outer casing being formed from a washable material and having a non-expanded configuration prior to said vacant expandable interior space being filled with popped corn kernels; and
    (b) a reclosable opening in said flexible outer casing for permitting reclosable access into said vacant expandable interior space for introducing corn kernels within said vacant expandable interior space, said flexible outer casing being positionable within a microwave oven in order to expose said corn kernels to microwave radiation and cause said corn kernels to burst into popped corn kernels within said vacant expandable interior space and expand said flexible outer casing into a playball configuration, whereby said reusable microwave popcorn container is usuable in play activities when filled with said popped corn kernels and wherefrom said popped corn kernels are dispensable through said reclosable opening for consumption.

2. The reusable microwave popcorn container of claim 1, wherein said reclosable opening comprises an elongated slit formed in said flexible outer casing, and a slit closure means operably associated with said elongated slit.

3. The reusable microwave popcorn container of claim 2, wherein said slit closure means is a zipper fastener or a hook-and-loop type fastener.

4. The reusable microwave popcorn container of claim 3, wherein said flexible outer casing forms an elongated football configuration when expanded by popcorn contained with said vacant expandable interior space.

5. The reusable microwave popcorn container of claim 4, wherein said flexible outer casing is formed by interfitting pieces of flexible washable sheet material which are seamed together.

6. The reusable microwave popcorn container of claim 4, wherein said reclosable opening comprises an elongated slit formed in said outer casing and a slit closure device operably associated with said elongated slit.

7. The reusable microwave popcorn container of claim 5, wherein said flexible washable material is fabric material.

8. The reusable microwave popcorn container of claim 5, which further comprises:
    means for venting to ambient atmosphere, vapor released from said popped corn kernels produced within said vacant expandable interior space.

* * * * *